United States Patent
Shimizu

(10) Patent No.: US 7,420,718 B2
(45) Date of Patent: Sep. 2, 2008

(54) SHEET CONVEYING APPARATUS, IMAGE READING APPARATUS AND CAM MEMBER DRIVING DEVICE

(75) Inventor: Koji Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1027 days.

(21) Appl. No.: 10/834,015

(22) Filed: Apr. 29, 2004

(65) Prior Publication Data

US 2004/0252354 A1 Dec. 16, 2004

(30) Foreign Application Priority Data

May 2, 2003 (JP) ............................... 2003-127467

(51) Int. Cl.
*H04N 1/04* (2006.01)
*B65H 5/22* (2006.01)
*B65H 5/00* (2006.01)

(52) U.S. Cl. .................. 358/498; 271/3.14; 271/10.14

(58) Field of Classification Search ................ 358/1.12, 358/1.18, 486, 487, 498; 271/3.01, 3.05, 271/3.06, 3.14, 8.1, 10.14
See application file for complete search history.

(56) References Cited

U.S. PATENT DOCUMENTS

| | | | |
|---|---|---|---|
| 4,675,533 A | | 6/1987 | Shimizu ..................... 250/578 |
| 4,737,856 A | | 4/1988 | Shimizu ..................... 358/285 |
| 4,755,834 A | | 7/1988 | Kunimitsu et al. ............ 346/76 |
| 5,016,031 A | * | 5/1991 | Shimada et al. ............. 396/413 |
| 5,040,079 A | | 8/1991 | Shimizu ..................... 358/451 |
| 5,083,412 A | * | 1/1992 | Sakaki et al. ................. 53/399 |
| 5,947,465 A | * | 9/1999 | Kato et al. ................ 271/10.11 |
| 6,292,641 B1 | * | 9/2001 | Takeyama et al. ............ 399/228 |
| 2002/0029719 A1 | * | 3/2002 | Matsukawa ................. 104/287 |
| 2004/0020320 A1 | * | 2/2004 | Ohsawa ....................... 74/425 |
| 2004/0025739 A1 | * | 2/2004 | Matsukawa .................. 104/96 |
| 2004/0041331 A1 | * | 3/2004 | Sonoda et al. .............. 271/121 |
| 2004/0188024 A1 | * | 9/2004 | Hwang et al. ............... 156/361 |

FOREIGN PATENT DOCUMENTS

| | | |
|---|---|---|
| JP | 59-43766 | 3/1984 |
| JP | 62-41067 | 2/1987 |
| JP | 62-127270 | 6/1987 |
| JP | 2003-34450 | 2/2003 |

* cited by examiner

*Primary Examiner*—Jerome Grant, II
(74) *Attorney, Agent, or Firm*—Fitzpatrick, Cella, Harper & Scinto

(57) ABSTRACT

There are provided a cam 23 which can be rotated by a releasing motor M4, a contact/separation lever 24 which is moved according to the rotation of the cam 23, a light shielding plate 25 and a cam position detecting sensor S7 which detect the rotational position of the cam, and a CPU circuit unit for controlling the rotation of the releasing motor based on the detecting operation by the light shielding plate and the cam position detecting sensor. The CPU circuit unit controls the rotation of the releasing motor M4 in such a manner that the cam is rotated reversely when a state detected by the light shielding plate and the cam position detecting sensor is not varied even if the releasing motor M4 is controlled to be rotated.

14 Claims, 9 Drawing Sheets

SHEET CONVEYING APPARATUS, IMAGE READING APPARATUS AND CAM MEMBER DRIVING DEVICE

BACKGROUND OF THE INVENTION

1. Field of the Invention

The present invention relates to a sheet conveying apparatus, for example, in which a cam member is used to press one roller of a pair of rollers for conveying a sheet against the other roller and separate one roller from the other-roller, and an image reading apparatus for reading an image on the sheet conveyed by the sheet conveying apparatus. Furthermore, the present invention relates to a cam member driving device for operating an operating member according to rotation of a cam member.

2. Description of Related Art

A document conveying apparatus (i.e., a sheet conveying apparatus) for feeding a document to a reading position is provided in an image reading apparatus equipped with "a running and reading function" of reading an image on a document (i.e., a sheet), which is fed to a reading glass and passes the reading position, by a reader staying at the reading position.

The image reading apparatus equipped with the running and reading function is adapted to read the document conveyed by the document conveying apparatus. Therefore, deflection occurring on the document being conveyed has caused an image deviation on an output image. This is because a shock of rushing into the roller pair disposed in the document conveying apparatus of the fore end of the document or passage of the rear end of the document causes a fluctuation in document conveying speed. In particular, since the rear end of the document is abruptly released from being pressed (i.e., held) by the roller pair when the rear end of the document passes through the roller pair, the image deviation has been liable to be generated. In the case of a thin document, the image deviation has been particularly liable to be generated.

As measures to solve the above-described problem has been known to release the holding of the document by the roller pair before the rear end of the document passes through the roller pair. In this case, since there has been a possibility of marked generation of the image deviation when a holding pressure is abruptly released, the holding pressure must be gradually reduced. Thus, it is construed that the rollers are gradually pressed with each other and gradually separated from each other by slowly rotating a cam having an inclination formed for releasing the pressure of the roller pair by a driving motor.

With the above-described configuration, the shape of the cam having the inclination need satisfy the following requirements: (1) when the roller pair starts to hold the document, the document can be securely conveyed; (2) conveying force is applied to the roller pair such that no image deviation is caused by the fluctuation in document conveying speed during reading the document; and (3) no holding force of the roller pair is exerted on the document when the document is separated from the roller pair.

Consequently, the cam must be frequently formed into such a shape as to increase a fluctuation in load to be exerted on the driving motor.

In the above-described configuration, the cam must be rotated in such a manner as to separate the roller pair while providing a timing of the document being conveyed. As a consequence, the cam need be located at a position of a predetermined rotational angle. In other words, the cam can be stopped at any rotational position, for example, immediately after a power source is turned on or after jamming of the document is cleared. In view of this, it is necessary to perform an initial operation to move the cam to the position of the predetermined rotational angle or a position at which the cam can be speedily moved to the position of the predetermined rotational angle. In conveying the document, the cam is started to be rotated from the position of the predetermined rotational angle while providing the timing of the conveyance of the document. Incidentally, during the conveyance of the document (i.e., during a normal operation), the cam performs a separating operation and a pressurizing operation of the roller pair. Therefore, the cam can be smoothly rotated by setting the driving motor in such a manner as to obtain rotating torque required for the rotation of the cam from the position of the predetermined rotational angle.

However, when the initial operation is performed to rotate the cam to the position of the predetermined rotational angle during waiting (i.e., during standing by) or the like, the cam is started to rotate in a state in which a current position is indefinite. Therefore, it is impossible to find the magnitude of the load of the rotating torque required for the rotation of the cam in a stop state. Consequently, when the driving motor is started, for example, in the state in which the cam is located at the position of the rotational angle at which the load of the rotating torque is highest, the rotating torque of the driving motor becomes insufficient, thereby causing a danger of a power swing of the driving motor. The accidental power swing of the driving motor induces an initial error, so that the document conveying apparatus is stopped accordingly. Otherwise, there has arisen a problem that the driving motor cannot be restored from the state of the power swing.

As measures for solving the above-described problems, there has been known a sheet conveying apparatus provided with a plurality of position detecting means for detecting a rotational position of a cam, in which the rotational speed of the motor is decreased in the vicinity of a position at which a maximum load of the cam is generated, thereby rotating the cam at a high rotating torque (see, for example, the prior art disclosed in FIGS. 4 and 5 of Japanese Patent Application Laid-Open (JP-A) No. 62-127270). In this case, it is necessary to provide the plurality of position detecting means for detecting the rotational position of the cam, thereby raising a problem of an increase in cost.

As other measures, there has been known a device in which the rotational speed of a motor is halved by initially starting the motor at several hundreds of pulses by 1-2 phase excitation at the time of the initial start of the motor; to which a large load is applied, by utilizing the characteristics of the motor, thereby increasing generating torque, followed by switching to 2 phase excitation (see column 8, line 11 to column 9, line 4 disclosed in JP-A No. 59-43766). In this case, there has arisen a problem of a complicated control.

That is to say, in a cam member driving device, when a driving motor is started to be rotated from a position of a rotational angle at which a load is largest in the cam having a large load fluctuation, the torque of the driving motor becomes insufficient, thereby causing a power swing of the driving motor, which is thus stopped due to an initial error. Consequently, the conventional cam member driving device has required excessive electric power at the time of starting acceleration of the motor or a complicated control. Moreover, since there are provided the plurality of position detecting means for detecting the position of the cam, a cost has been increased.

An object of the present invention is to provide a cam member driving device or a sheet conveying apparatus capable of performing an initial operation without requiring excessive electric power or a complicated control.

Another object of the present invention is to provide an image reading apparatus provided with the above-described sheet conveying apparatus in a simple structure at a reduced cost.

SUMMARY OF THE INVENTION

In order to achieve the above-described objects, a sheet conveying apparatus according to the present invention comprises a pair of conveyance rotating members for conveying a sheet while holding the sheet and rotating; a rotatable cam member; a forward and reversely rotatable motor for rotating the cam member; an operating member which contacts against the cam member so as to operate in such a manner as to press one of the pair of conveyance rotating members against the other conveyance rotating member and separate one from the other according to the rotation of the cam member; a detecting unit for detecting a rotation of the cam member; and control means for controlling the motor based on the detection result output from the detecting unit; wherein the control means controls to reversely rotate the motor in the case where the detecting unit does not detect the rotation of the cam member even if the motor is driven to be rotated forward so as to rotate the cam member.

Furthermore, an image reading apparatus according to the present invention comprises a reading sensor for reading an image on a sheet; a pair of conveyance rotating members for conveying the sheet to the reading sensor while holding the sheet and rotating; a rotatable cam member; a forward and reversely rotatable motor for rotating the cam member; an operating member which contacts against the cam member so as to operate in such a manner as to press one of the pair of conveyance rotating members against the other conveyance rotating member and separate one from the other according to the rotation of the cam member; a detecting unit for detecting a rotation of the cam member; and control means for controlling the motor based on the detection result output from the detecting unit; wherein the control means controls to reversely rotate the motor in the case where the detecting unit does not detect the rotation of the cam member even if the motor is driven to be rotated forward so as to rotate the cam member.

Moreover, a cam member driving device according to the present invention comprises a cam member; a member which is moved according to the rotation of the cam member in contact against the cam member; a forward and reversely rotatable motor for rotating the cam member; a detecting unit for detecting a rotation of the cam member; and control means for controlling the motor based on the detection result output from the detecting unit; wherein the control means controls the motor to reversely rotate the cam member in the case where the detecting unit does not detect the rotation of the cam member even if the motor is driven to be rotated forward so as to rotate the cam member.

DETAILED DESCRIPTION OF THE PREFERRED EMBODIMENT

A description will be given below of a document conveying apparatus in an embodiment according to the present invention and a copying machine having the document conveying apparatus in reference to the attached drawings. Numeric values used in the description of the embodiment according to the present invention are merely referential numeric values, and therefore, they never limit the present invention.

First of all, explanation will be made on the copying machine. Thereafter, explanation will be made on the document conveying apparatus.

[Copying Machine]

Figure 1:
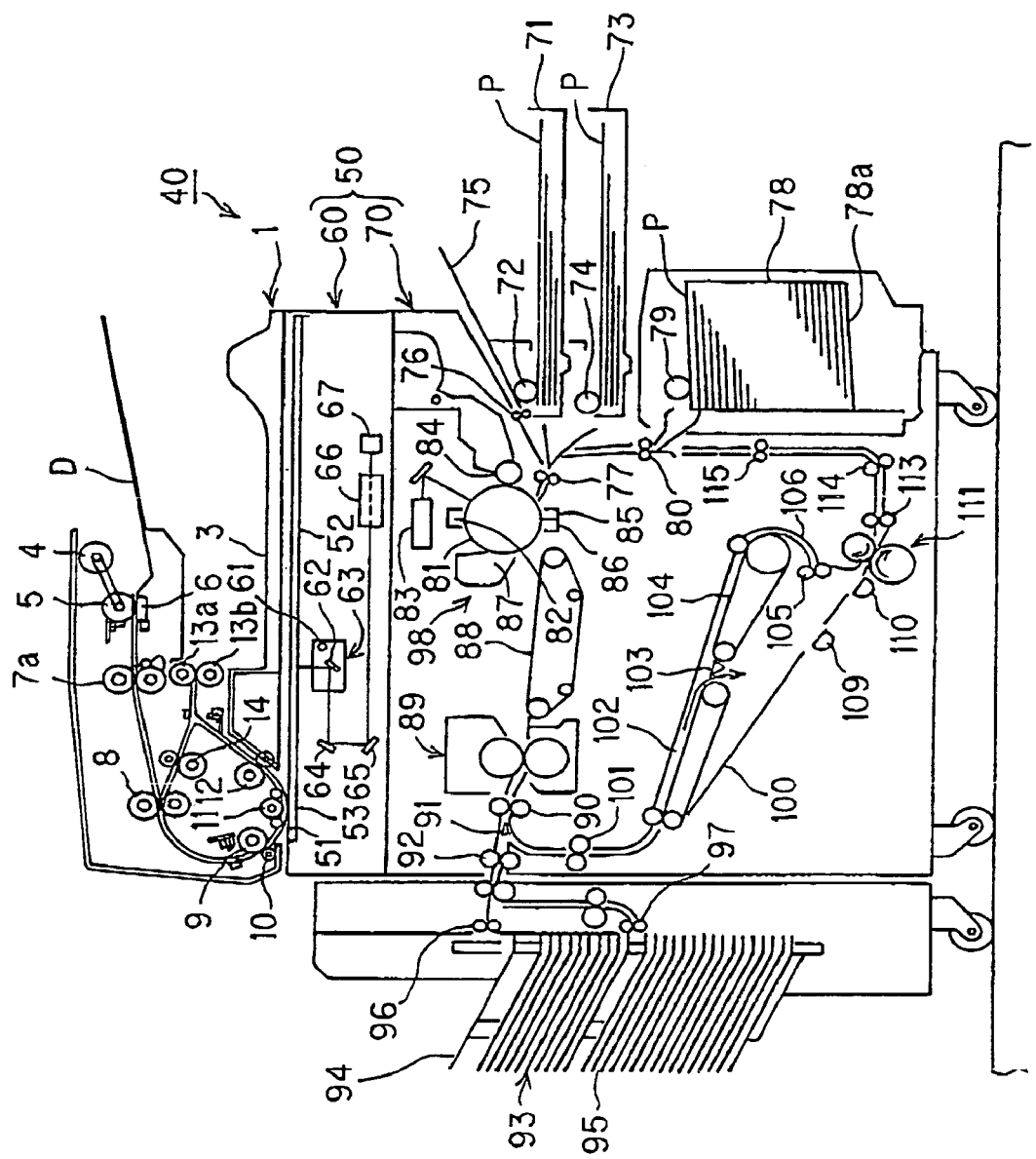
FIG. 1 is a front cross-sectional view schematically showing an image forming apparatus provided with a document conveying apparatus as one example of a sheet conveying apparatus in an embodiment according to the present invention.

FIG. 1 is a view showing the schematic configuration of a copying machine 40 for use in an image processing apparatus.

The copying machine 40 as one example of an image forming apparatus in the image processing apparatus is provided with a copying machine main unit 50 and a document conveying apparatus 1 as one example of a sheet conveying apparatus disposed above the copying machine main unit 50. The copying machine main unit 50 includes a printer unit 70 and a reader unit 60 as one example of an image reading apparatus disposed above the printer unit 70.

The document conveying apparatus 1 serving as the sheet conveying apparatus is disposed above the copying machine main unit 50 in such a manner as to be freely opened or closed with respect to a book platen 52. At the upper portion of the document conveying apparatus 1 is disposed a stack tray 2. Documents D having images formed thereon are stacked on the stack tray 2 by, for example, a user. The document conveying apparatus 1 separates an uppermost document one by one sequentially from the documents D stacked on the stack tray 2, and then, conveys it to a running and reading platen glass (i.e., a platen) 51 disposed at a reading position 53 in the reader unit 60. In the document conveying apparatus 1, the reader unit 60 reads an image formed on the document while the document passes the reading position 53, and thereafter, the document is discharged to and stacked on a discharge tray 3.

The reader unit 60 in the copying machine main unit 50 optically reads image information recorded on the document D, followed by photoelectric transfer, and then, inputs it as image data. The reader unit 60 includes the running and reading platen 51, the book platen 52, a scanner unit 63, mirrors 64 and 65, a lens 66, an image sensor 67 and the like.

The scanner unit 63 consists of a lamp 61 and a mirror 62, and it is designed to be freely moved in a lateral direction in FIG. 1.

In the reader unit 60, when the document is run and read by the use of the document conveying apparatus 1, the scanner unit 63 is stopped at the reading position 53. An image of the document passing on the running and reading platen 51 by the document conveying apparatus 1 is read by the scanner unit 63. In the reader unit 60, an image of a book, a magazine, the document or the like placed on the book platen 52 by the user may be read while the scanner unit 63 is moved without using the document conveying apparatus 1.

The printer unit 70 is adapted to form an image on a sheet as a recording medium by a well-known electrostatic latent image forming system. Specific examples of the sheet include a plain sheet, a thin sheet made of a resin as a substitute of a plain sheet, a cardboard, a letter, a post card and the like.

The printer unit 70 is provided at the side thereof with an upper cassette 71, a lower cassette 73, a manual guide 75 and a sheet deck 78, on which sheets P are stacked.

Sheets stacked on the upper cassette 71 are separated one by one by the effect of a separating claw and a feed roller 72, to be thus fed into a registration roller pair 77. In the same manner, sheets stacked on the lower cassette 73 are separated one by one by the effect of a separating claw and a feed roller 74, to be thus fed into the registration roller pair 77. Sheets supplied to the manual guide 75 by the user are separated one by one, to be thus fed into the registration roller pair 77 by rollers 76. The sheet deck 78 is provided with an intermediate plate 78a which is lifted up or down by a motor or the like. Sheets placed on the intermediate plate 78a are separated one by one by the effect of a feed roller 79 and a separating claw, to be thus fed into a conveyance roller pair 80, and thereafter, are fed into the registration roller pair 77 by the conveyance roller pair 80. In this manner, the sheet is fed into the registration roller pair 77 from any one of the upper cassette 71, the lower cassette 73, the manual guide 75 and the sheet deck 78.

In the meantime, the surface of a photosensitive drum 81 is electrically charged by a primary charger 82 in a uniform manner. The surface of the uniformly charged photosensitive drum 81 is irradiated with an image light beam (i.e., image information) by an optical unit 83. Consequently, an electrostatic latent image is formed on the photosensitive drum 81. Furthermore, a toner image corresponding to the image information is formed on the photosensitive drum 81 by a development unit 84.

The registration roller pair 77 feeds the sheet between the photosensitive drum 81 having the toner image formed thereon and a transfer charger 85. The transfer charger 85 transfers the toner image on the sheet. A separation charger 86 separates the sheet from the photosensitive drum 81. A cleaner 87 removes the toner remaining on the photosensitive drum 81 after the transferring.

These photosensitive drum 81, primary charger 82, optical unit 83, development unit 84 and the like constitute an image forming unit 98 as one example of image forming means.

A conveyor belt 88 conveys the sheet having the image formed thereon from the photosensitive drum 81 to a fixing device 89. The fixing device 89 heats and pressurizes the sheet, and then, fixes the transferred toner image onto the sheet. Conveyance rollers 90 convey the sheet having the toner image fixed thereonto. A diverter 91 guides the sheet to discharge rollers 92. A sorter 93 consists of a non-sort tray 94, a sort bin tray 95, non-sort tray discharge rollers 96 and sort bin tray discharge rollers 97. The non-sort tray 94 and the sort bin tray 95 are lifted up or down to classify the sheets into stages. Incidentally, a discharge tray may be disposed in place of the sorter 93.

In the case where the images are copied on both sides of the sheet or the images are copied on either side in a multiple manner, the sheet having the toner image fixed thereonto is guided to conveyance rollers 101 by the diverter 91. In the case of both-sided copying, the sheet is discharged to an intermediate tray 100 via belts 102 and 104, a path 106 and discharge rollers 105. Semicircular rollers 109 and 110 convey the sheet on the intermediate tray 100 to a separation roller pair 111. Furthermore, conveyance rollers 113, 114 and 115 convey the sheet to the registration roller pair 77.

[Document Conveying Apparatus]

Figure 2:
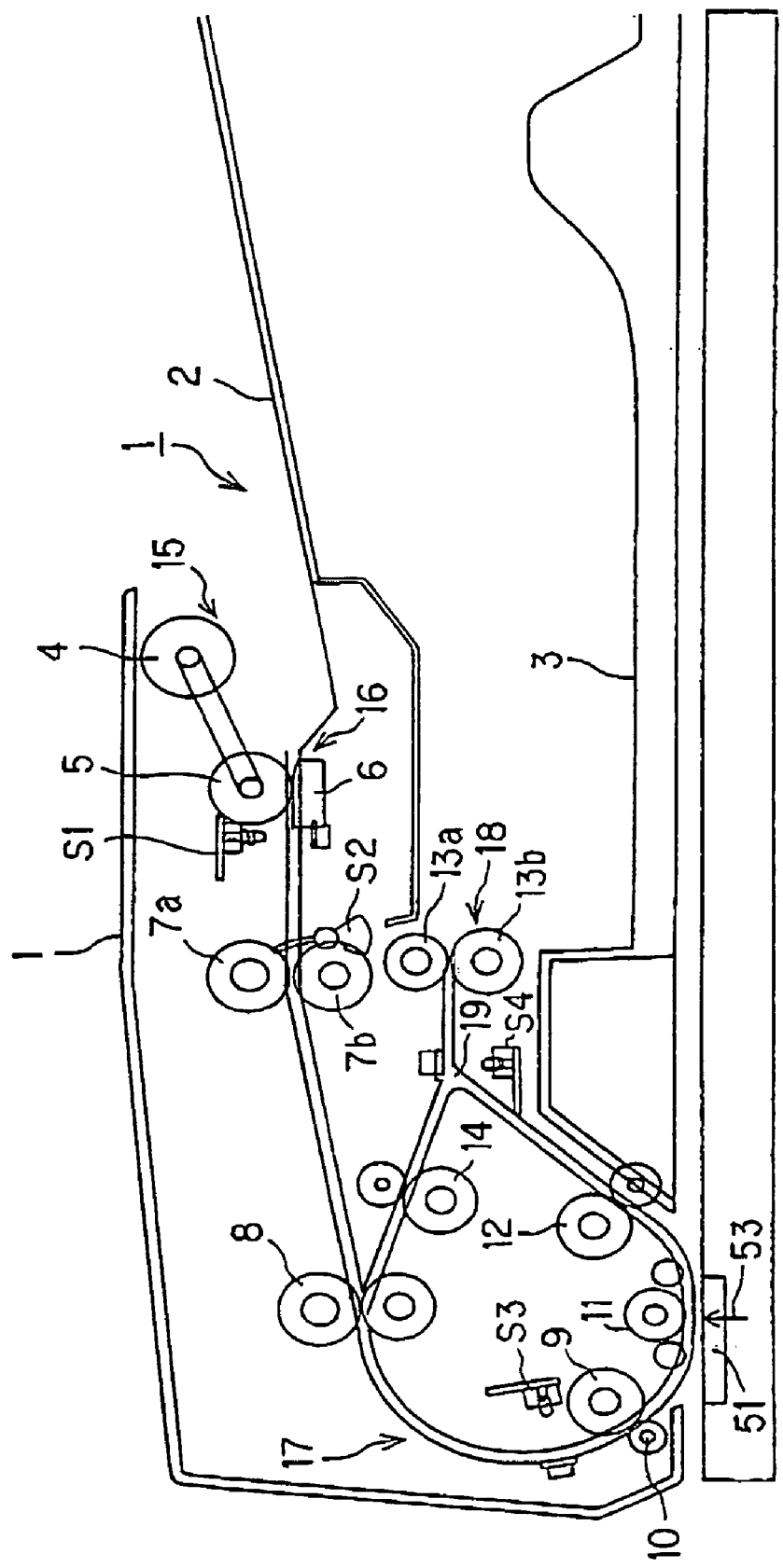
FIG. 2 is a front cross-sectional view schematically showing the document conveying apparatus as one example of the sheet conveying apparatus in the embodiment according to the present invention.

FIG. 2 is a front view schematically showing the document conveying apparatus as one example of the sheet conveying apparatus. The document conveying apparatus 1 is configured such that the sheets (for example, the documents) having the images formed thereon are automatically supplied one by one by the reader unit 60. The document conveying apparatus 1 may be configured such that the documents are manually supplied one by one by the reader unit 60.

The document conveying apparatus 1 is equipped with a one-side reading mode in which the image information is read while conveying the document having the image information formed on either side thereof, and a both-side reading mode in which the image information is read while conveying the document having the image information formed on both sides thereof. Hereinafter, explanation will be made on each of the reading modes in accordance with the flow of the document.

First of all, the flow of the document having the image information formed on either side thereof in the one-side reading mode will be described in addition to the explanation of the configuration of the document conveying apparatus 1.

The document conveying apparatus 1 includes the stack tray 2, on which the documents are stacked by the user. A bundle of documents stacked on the stack tray 2 is drawn into a separating unit 16 via a pick up roller 4. A feed roller 5 and a frictional separating pad 6 constituting the separating unit 16 convey the documents one by one to first registration rollers 7a and 7b while separating an uppermost document from the other documents.

The first registration rollers 7a and 7b stop when the fore end of the document reaches, so as to receive the fore end of the document. Since the feed roller 5 continues to convey the document, the fore end of the document is pressed against nips of the first registration rollers 7a and 7b, and therefore, the document bends. If the bending document is conveyed slantwise, it is corrected straight. Thereafter, the document is conveyed to a document conveying unit 17, described later, according to the rotation of the first registration rollers 7a and 7b.

Figure 3:
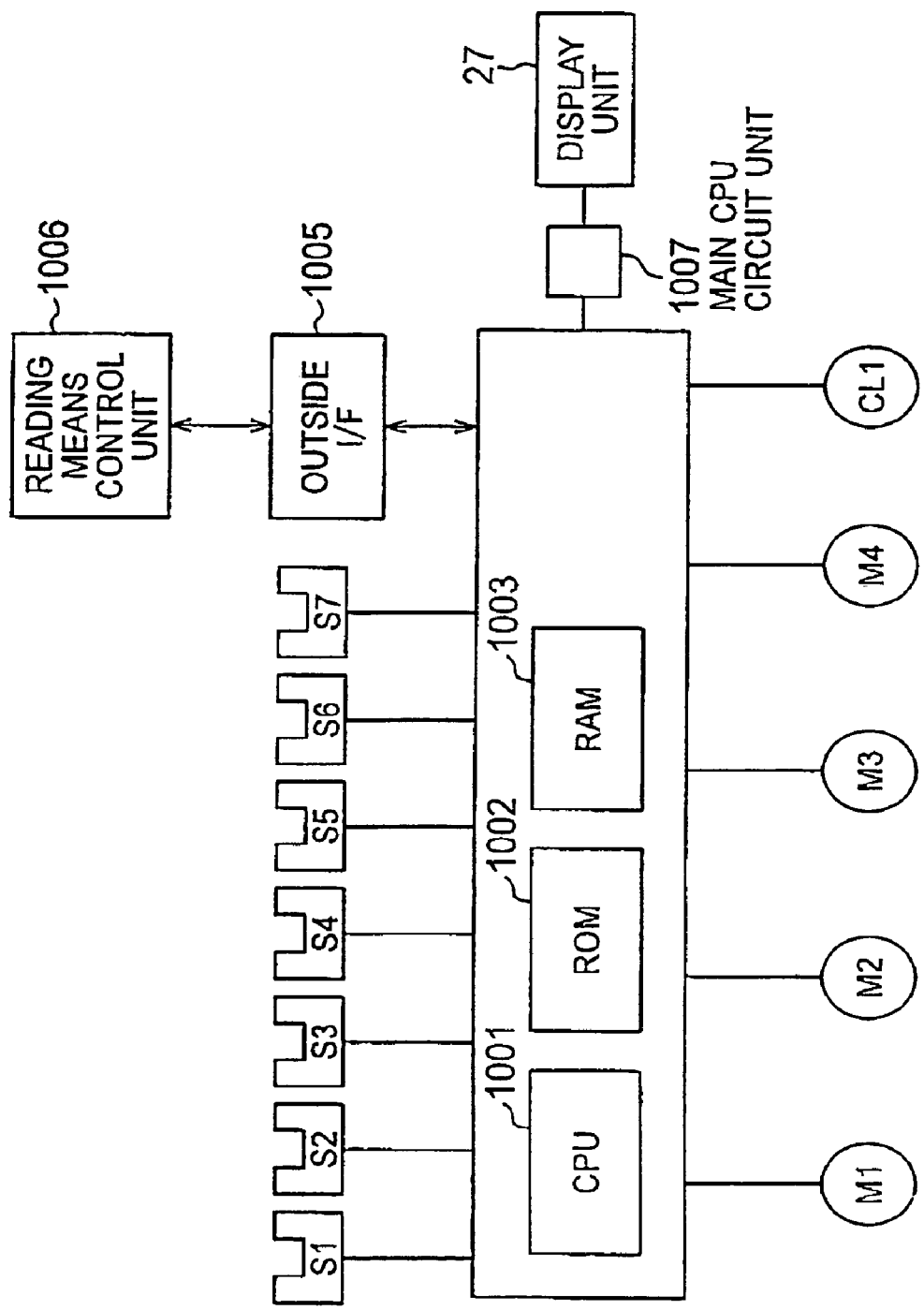
FIG. 3 is a block diagram of hardware illustrating the document conveying apparatus shown in FIG. 2.

In the document conveying unit 17 in the document conveying apparatus 1, the document conveyed from a document feed unit 15 is conveyed on the running and reading platen 51 at a predetermined speed via a second registration roller pair 8, a first lead roller 9, a lead roller 10 and a platen roller 11. Before the fore end of the document reaches the first lead roller 9 and the lead roller 10, a releasing motor (i.e., a driving motor) M4, as illustrated in FIGS. 3 and 4, is rotated. This rotation causes the lead roller 10 to be pressed against the first lead roller 9. At this time, the scanner unit 63, as shown in FIG. 1, serving as an exposure device stays under the reading position 53 on the running and reading platen 51. After the fore end of the document reaches the platen roller 11, the scanner unit 63 performs an exposing operation (i.e., a reading operation). During the exposing operation, the lead roller 10 is separated from the first lead roller 9. The lead roller 10 is gradually separated from the first lead roller 9 by the effect of the driving motor M4 before the rear end of the document passes the first lead roller 9 and the lead roller 10. At this time, the fore end of the document passes through a second lead roller 12, and therefore, the document is conveyed by the second lead roller 12.

The first lead roller 9 and the lead roller 10 constitute a conveyance rotating member pair.

In a document discharging unit 18 in the document conveying apparatus 1, a discharge reversing roller 13b is separated from another discharge reversing roller 13a during the exposing operation at the reading position 53 by the scanner unit 63. Upon completion of the image reading by the reader unit 60 after the rear end of the document passes through the reading position 53, a solenoid, not shown, is turned on, so that the discharge reversing roller 13b and the discharge reversing roller 13a are rotated while holding the document therebetween, so as to discharge the document onto the discharge tray 3 in a state in which the reverse of the document faces up.

In FIG. 2, a size sensor S1 is configured in such a manner as to detect the fore and rear ends of the document and detect the separated document, and at the same time, to measure the size of the document in cooperation with a CPU circuit unit 1000, described later. A registration sensor S2 is configured in such a manner as to detect the fore end of the document. A lead sensor S3 is configured in such a manner as to detect the fore end of the document so as to transmit a reading signal to the reader unit 60 in the copying machine main unit 50. A discharge sensor S4 is configured in such a manner as to detect the fore and rear ends of the document.

Next, a description will be given of the flow of the document having the image information formed on both sides thereof in the double-side reading mode.

First of all, the documents stacked on the stack tray 2 are fed to the separating unit 16 by the document feed unit 15. The separating unit 16 separates the documents one by one, and thereafter, conveys them to the document conveying unit 17. In the same manner that the document having the image formed on either side thereof is read, the document conveying unit 17 conveys the document onto the running and reading platen 51 at a predetermined speed. At this time, the scanner unit 63 serving as the exposure device stays under the reading position 53. The scanner unit 63 performs the exposing operation (i.e., the reading operation) with respect to a first side, i.e., an obverse of the document. Also at this time, the lead roller 10 is separated from the first lead roller 9.

After the rear end of the document passes a Y-shaped path 19 downstream of the discharge sensor S4, the pair of discharge reversing rollers 13a and 13b are temporarily stopped from being rotated, and then, are reversely rotated. In this manner, the document is switched back to be conveyed to reversing rollers 14 and the second registration roller pair 8 in the document conveying unit 17 located in a direction reverse to the document discharging direction. Consequently, the obverse and reverse of the document are turned over. The second registration roller pair 8 are stopped from being rotated when the fore end of the document reaches there, and therefore, receive the fore end of the document. The discharge reversing rollers 13a and 13b continue to convey the document. As a consequence, the document is corrected straight by bending if the document is conveyed slantwise. Thereafter, the pair of second registration roller pair 8 convey the document to the document conveying unit 17. During this time, the lead roller 10 is pressed against the first lead roller 9.

In the same manner that the image formed on the first side, i.e., the obverse is read, a second side, i.e., the reverse is subjected to the exposing operation (i.e., the reading operation) by the scanner unit 63 in the document conveying unit 17. Thereafter, the document conveying unit 17 conveys the document to the document discharging unit 18. Also at this time, the lead roller 10 is separated from the first lead roller 9.

Assume that the document is discharged as it is by the document discharging unit 18 after the second side, i.e., the reverse is read In this case, the document is discharged in a face-up state (that is, in a state in which the first side, i.e., the obverse faces upward in the conveyor) from the viewpoint of the configuration of the document conveying apparatus 1 in the present embodiment. Therefore, the documents stacked in the order of pages on the stack tray 2 are stacked on the discharge tray 3 in the reverse order of pages. In view of this, the document discharging unit 18 need perform another reversing operation for switching back again and conveying the document.

Thus, the document discharging unit 18 reversely rotates the discharge reversing rollers 13a and 13b after the rear end of the document passes through the Y-shaped path 19 downstream of the discharge sensor S4. In this manner, the document is switched back and conveyed, and then, is conveyed again to the document conveying unit 17. During this time, the lead roller 10 is pressed against the first lead roller 9. At this time, since the document conveying unit 17 simply conveys the document in the state in which the reverse of the document faces up, the second registration rollers 8 do not correct the slantwise conveyance of the document.

The document passing through the document conveying unit 17 is conveyed again to the document discharging unit 18. And then, the document is discharged onto the discharge tray 3 with the reverse thereof facing up while it is held between the discharge reversing rollers 13a and 13b. Thus, the documents can be stacked on the discharge tray 3 in the order of pages in a face-down state, that is, in a state in which the first side, i.e., the obverse faces down.

[Control Block Diagram of Document Conveying Apparatus]

FIG. 3 is a control block diagram illustrating the document conveying apparatus 1. The CPU circuit unit 1000 as one example of control means includes a CPU 1001 for controlling the entire document conveying apparatus. Furthermore, the CPU circuit unit 1000 includes a ROM 1002 and a RAM 1003. The ROM 1002 stores therein a program for controlling the entire document conveying apparatus. The RAM 1003 is adapted to be used as a region, in which control data is temporarily stored, or a work region for calculation in accordance with the control. An outside I/F 1005 is an interface, via which the CPU circuit unit 1000 carries out communications with an image reading means control unit 1006 in the reader unit 60. To the CPU circuit unit 1000 is connected a main CPU circuit unit 1007 for controlling the copying machine main unit 50. To the main CPU circuit unit 1007 is connected a display unit 27. The display unit 27 is disposed at the upper portion of the copying machine main unit 50. The display unit 27 includes a touch panel, not shown, for issuing a control instruction to the document conveying apparatus 1, the copying machine main unit 50, the sorter 93 and the like, a display or the like, not shown, for displaying an operating state and an abnormal state, and the like. Here, the CPU circuit unit 1000 is incorporated in the document conveying apparatus 1; and, the main CPU circuit unit 1007 is incorporated in the copying machine main unit 50. Incidentally, the CPU circuit unit 1000 and the main CPU circuit unit 1007 may be integrated with each other, and thus, may be incorporated in either one of the document conveying apparatus 1 and the copying machine main unit 50.

The CPU circuit unit 1000 controls a separation feed motor M1, a lead motor M2, a discharge reversing motor M3, the releasing motor M4, an electromagnetic clutch CL1, the size sensor S1, the registration sensor S2, the lead sensor S3, the discharge sensor S4, a document distinction sensor S5, a document size distinction sensor S6, and a cam position detecting sensor S7 for monitoring a pressure state of the lead roller 10 with respect to the first lead roller 9. Here, the separation feed motor M1 is used to separate the document, so as to convey it to the second registration roller pair 8. The lead motor M2 is used to drive the second registration roller pair 8, the first lead roller 9, the lead roller 10, the platen roller 11 and the second lead roller 12 in the document conveying unit 17. The discharge reversing motor M3 is used to drive the reversing rollers 14 during the document discharging operation and in the both-side reading mode. The releasing motor M4 is used to press the lead roller 10 against the first lead roller 9 and separate the lead roller 10 from the first lead roller 9. The document conveying apparatus 1 conveys the document by actuating the component parts under the control of the CPU circuit unit 1000.

[Description of Separation Configuration of Lead Roller 10 and its Operation]

Figure 5:
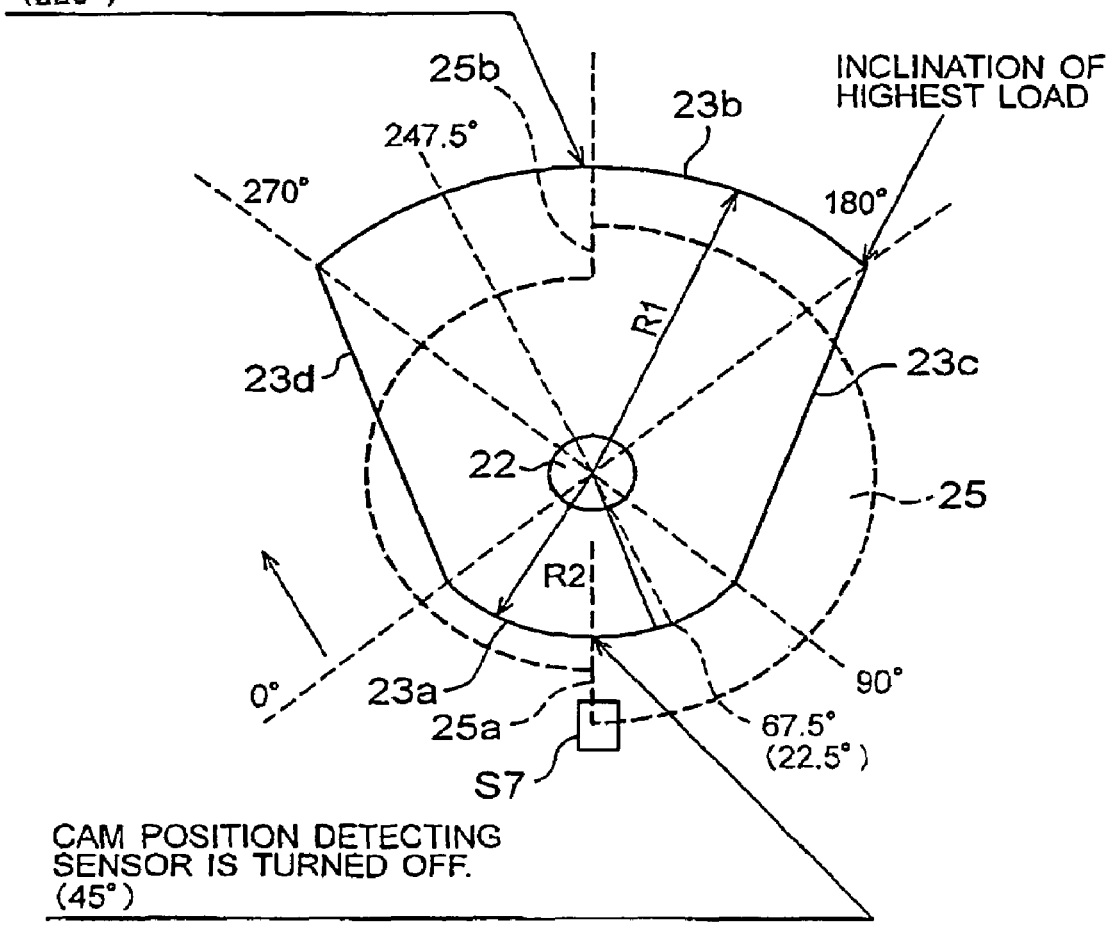
FIG. 5 is a view illustrating the arrangement interrelationship among the cam, the light shielding plate and the sensor.
Figure 6:
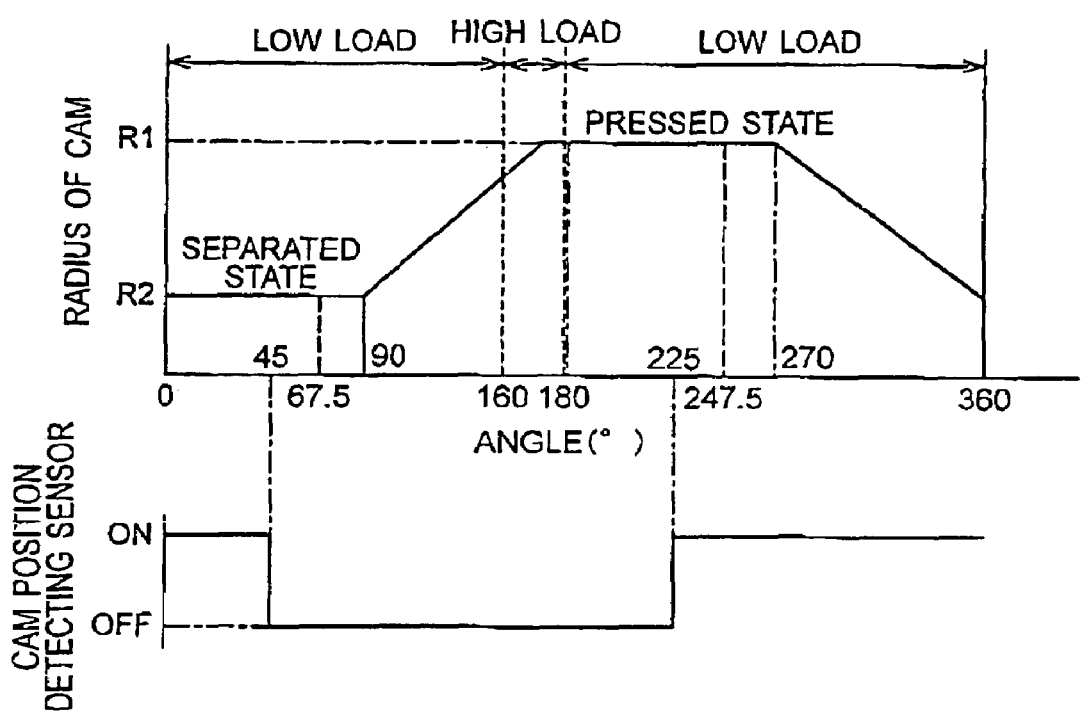
FIG. 6 is a chart illustrating the cam, a state of a load and an output state of a cam position detecting sensor.

A description will be given of the configuration and operation in order to press the lead roller 10 against the first lead roller 9 or separate the lead roller 10 from the first lead roller 9. A cam member driving device 26 is prepared in order to press the lead roller 10 against the first lead roller 9 or separate the lead roller 10 from the first lead roller 9. FIGS. 4A to 4D are views showing the configuration of the cam member driving device 26. FIG. 5 is a diagram illustrating the shape of a cam serving as a cam member, a state of a load and an output state of the cam position detecting sensor S7. FIG. 6 is a chart illustrating the cam, the state of a load and the output state of the cam position detecting sensor.

Figure 4A:
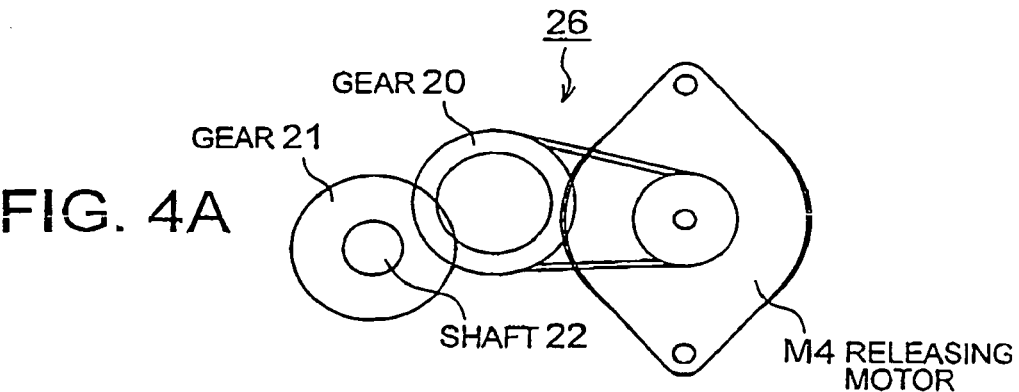
FIG. 4A is a view showing a driving motor for rotating a cam.

In FIG. 4A, gears 20 and 21 are rotated upon rotational control of the releasing motor M4 by the CPU circuit unit 1000. As shown in FIGS. 4A to 4D, a shaft 22 of the gear 21 is interlocked with a cam 23 as one example of the cam member and a light shielding plate 25 consisting of a plate member. When the cam 23 is rotated in accordance with the rotation of the shaft 22, an L-shaped lever 24 in contact with the outer periphery of the cam 23 is turned. The lever 24 is a member which abuts against the cam 23 and is turned in accordance with the rotation of the cam 23. The lead roller 10 is pressing against the first lead roller 9 or separating from the first lead roller 9 according to the positions of the lever 24 as one example of an operating member and the cam 23. The light shielding plate 25 and the cam position detecting sensor S7 constitute a detecting unit.

The lever 24 is brought into contact with the outer periphery of the cam 23 all the time by its own weight or a spring, not shown. At the outer periphery of the cam 23, there are formed two circular arcuate portions 23a and 23b different in radius of curvature and two straight portions 23c and 23d for connecting both ends of the two circular arcuate portions 23a and 23b, respectively. As a whole, the cam 23 is formed into a substantially triangle. As illustrated in FIG. 5, a radius of curvature of the arcuate portion 23a of the cam 23 is designated by R2; in contrast, a radius of curvature of the arcuate portion 23b is designated by R1, wherein the relationship of R2<R1 is satisfied. Incidentally, the cam member may consist of a cam having a groove formed into the same contour as the outer periphery of the cam 23. In this case, the lever is adapted to engage with the groove.

Figure 4B:
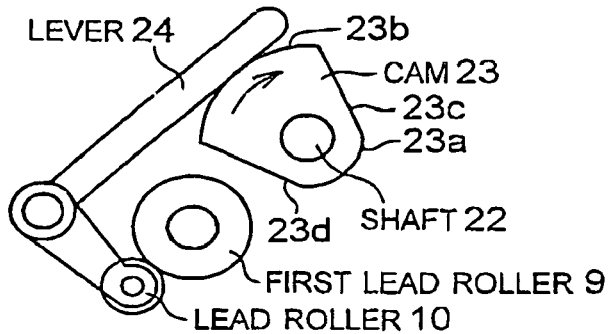
FIG. 4B is a view illustrating a state in which a lead roller is pressed against a first lead roller via the cam.
Figure 4C:
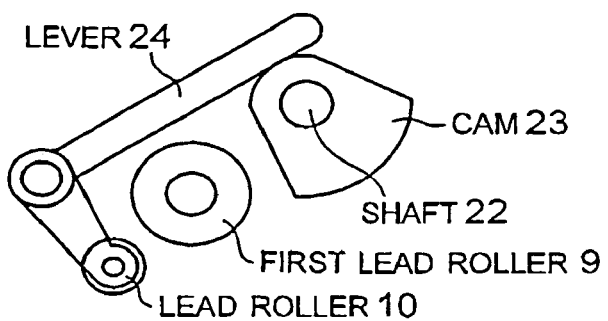
FIG. 4C is a view illustrating a state in which the lead roller is separated from the first lead roller.
Figure 4D:
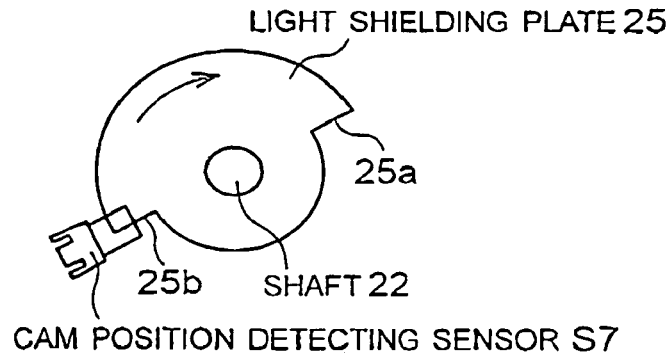
FIG. 4D is a view illustrating the arrangement relationship between a light shielding plate and a sensor.

FIG. 4B shows the state in which the lead roller 10 is pressed against the first lead roller 9. The lever 24 is lifted up by the cam 23, so that the lead roller 10 is pressed against the first lead roller 9. FIG. 4C shows the state in which the lead roller 10 is separated from the first lead roller 9. The lever 24 is lifted down in association with the cam 23, so that the lead roller 10 is separated from the first lead roller 9.

The position of the light shielding plate 25 is detected by the cam position detecting sensor S7. The light shielding plate 25 is used to detect as to whether the lead roller 10 is pressed against the first lead roller 9 or is separated from the first lead roller 9.

Explanation will be made on the operation of other members according to the rotation of the cam 23 in reference to the position of 0° of the cam 23 in FIG. 5. In the case where the cam 23 is rotated clockwise by the releasing motor M4 within a position from 0° to 90°, the lead roller 10 is separated from the first lead roller 9 (see FIG. 4C). When the cam 23 is located within a position from about 90° to about 180° or less, the lead roller 10 is gradually started to press against the first lead roller 9. If the cam 23 is located within a position from about 180° to about 270° or less, the lead roller 10 is completely pressing against the first lead roller 9 (see FIG. 4B). When the cam 23 is located within a position from about 270° to about 360° (i.e., 0°) or less, the lead roller 10 is gradually started to separate from the first lead roller 9.

The cam position detecting sensor S7 is shielded from light by the light shielding plate 25 when the light shielding plate 25 interlocked with the cam 23 is located at a position of about 45° Consequently, the cam position detecting sensor S7 can detect that the lead roller 10 is separated from the first lead roller 9. If the light shielding plate 25 is located at a position of about 225°, the cam position detecting sensor S7 can detect that the lead roller 10 is pressed against the first lead roller 9 in a transmission state. The releasing motor M4 gradually receives a load when the cam 23 is rotated from the position of about 90° to the position of about 180°, and then, receives a highest load when the cam 23 is located at the position of about 180°. The releasing motor M4 adopts self-starting drive. Therefore, the releasing motor M4 is slowly started, and thus, the lead roller 10 is gradually transferred from the state in pressing against the first lead roller 9 to the state separated from the first lead roller 9. As a consequence, it is possible to suppress an image deviation of the document during the exposing operation. Incidentally, although the rotational speed of the releasing motor M4 is varied straight, it may be varied stepwise as long as the image deviation of the document can be suppressed.

[Description of Pressure Operation of Lead Roller 10 Against First Lead Roller 9 and Separation Operation of Lead Roller 10 from First Lead Roller 9]

Figure 7:
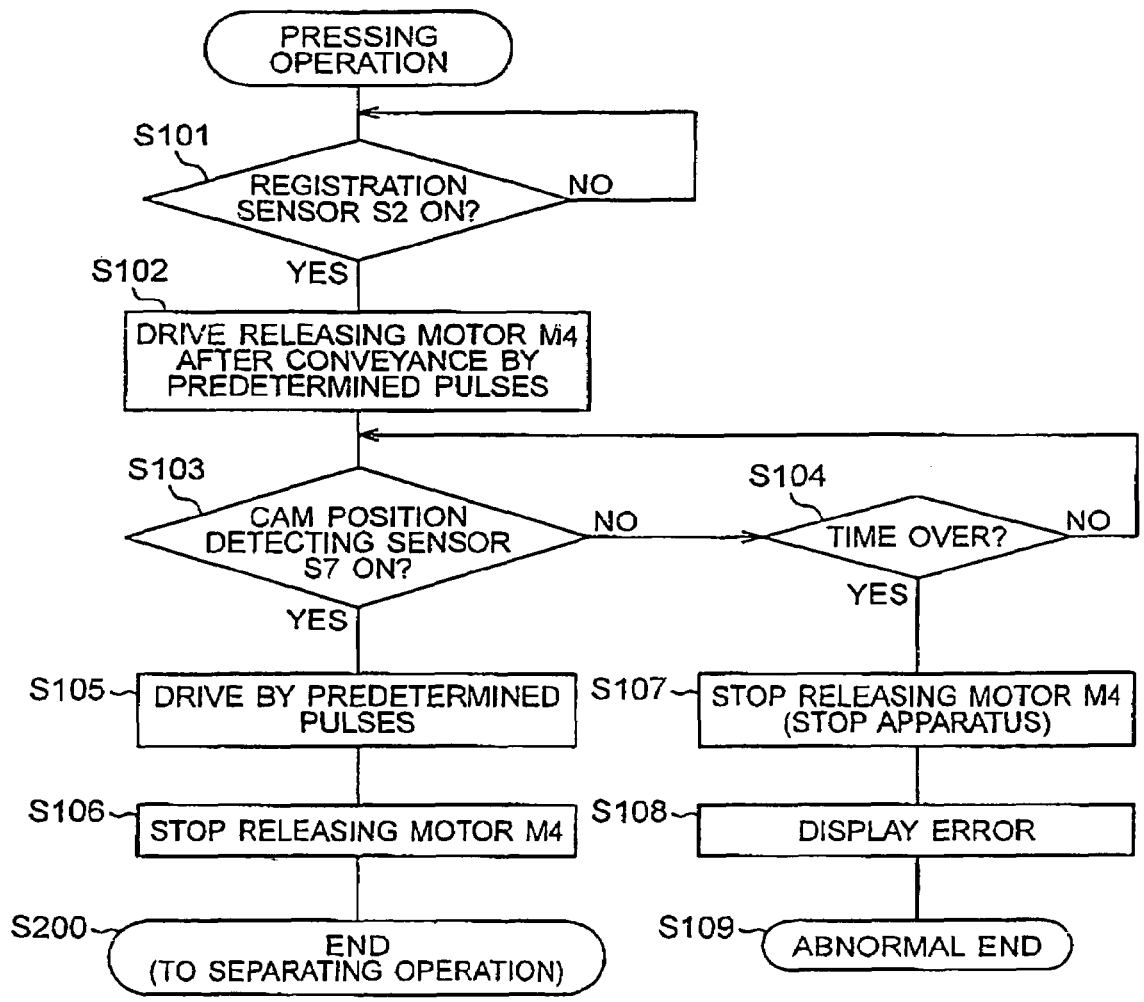
FIG. 7 is a flowchart illustrating operation of pressing the lead roller against the first lead roller.
Figure 8:
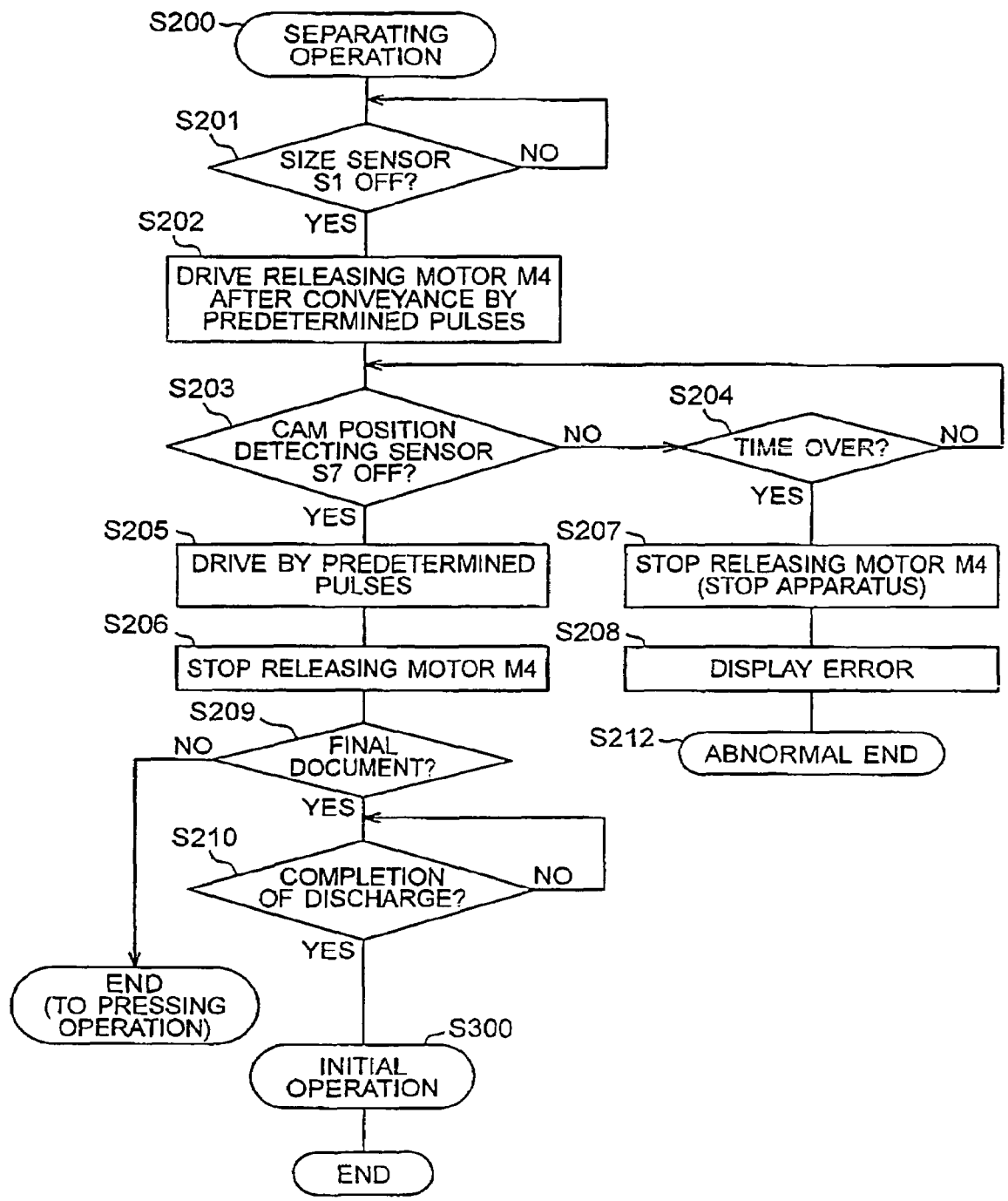
FIG. 8 is a flowchart illustrating operation of separating the lead roller from the first lead roller.

FIGS. 7 and 8 are flowcharts illustrating pressure or separation operations of the lead roller 10 with respect to the first lead roller 9 when the document is conveyed by the document conveying apparatus 1 in the one-side reading mode.

A drive source for pressing the lead roller 10 against the first lead roller 9 is only the releasing motor M4. However, there are various sizes of the documents to be conveyed. Therefore, the CPU 1001 is designed to manage a plurality of tasks at the same time. In accordance with the procedures of the control in a sequence, one pressurizing operation and one separating operation are performed per exposing operation.

Also in the both-side reading mode, one pressing operation and one separating operation of the lead roller 10 with respect to the first lead roller 9 are performed per exposing operation, and a point at which the releasing motor M4 is driven is the same as that in the one-side reading mode. However, the discharge sensor S4 is used as a sensor for detecting the fore and rear ends of the document.

Referring to FIGS. 2 to 7, explanation will be made on control in order to press the lead roller 10 against the first lead roller 9 by the CPU circuit unit 1000. When the documents are stacked on the stack tray 2 and a copy start key is depressed by the user, the CPU circuit unit 1000 controls the separation feed motor M1, so as to rotate the feed roller 5. The documents are separated one by one by the feed roller 5 and the frictional separating pad 6, and then, are conveyed to the first registration rollers 7a and 7b. The CPU circuit unit 1000 determines as to whether or not the registration sensor S2 is turned on by the effect of the fore end of the conveyed document (S101). After the CPU circuit unit 1000 determines that the registration sensor S2 is turned on by the effect of the fore end of the document, it controls to rotate the second registration roller pair 8. And then, the CPU circuit unit 1000 rotates the releasing motor M4 forward at the time when the document is conveyed a predetermined distance. Consequently, the cam 23 located at the position of about 67.5° illustrated in FIG. 5 is rotated forward (S102) During the rotation up to the position of about 180° after the start of the forward rotation of the cam 23, the lead roller 10 is pressed against the first lead roller 9 by the cam 23. Here, after the lead roller 10 is pressed against the first lead roller 9, the CPU circuit unit 1000 starts to rotate the releasing motor M4 forward in such a manner that the fore end of the document intrudes between the nips of the lead roller 10 and the first lead roller 9.

Furthermore, when the light shielding plate 25 reaches the position of about 225° and the cam position detecting sensor S7 is turned on (i.e., in the transmission state) (S103), the CPU circuit unit 1000 controls the releasing motor M4 so as to rotate the cam 23 by a residual angle of about 22.5° (S105). In this manner, the cam 23 is stopped at a position of about 247.5° (S106). In this state, the lead roller 10 is pressed against the first lead roller 9 by the cam 23.

In S102 and S103, when the cam position detecting sensor S7 cannot be turned on even if a predetermined period of time is elapsed after the CPU circuit unit 1000 starts to control the releasing motor M4 (S104), the CPU circuit unit 1000 stops the releasing motor M4 (S107). Moreover, the CPU circuit unit 1000 displays an error on informing means such as the display unit 27 (see FIG. 3) via the main CPU circuit unit 1007 (S108), thereby leading to abnormal end (S109).

A description will be given of an operation control for separating the lead roller 10 from the first lead roller 9 by the CPU circuit unit 1000 in reference to FIGS. 2 to 6 and 8. The operation for separating the lead roller 10 from the first lead roller 9 is surely performed during the image reading.

First of all, at the time when the document is conveyed by a predetermined distance after the rear end of the document passes through the size sensor S1 serving as a sheet detecting sensor (i.e., OFF) (S201), the CPU circuit unit 1000 starts to rotate the releasing motor M4 forward. In this manner, the cam 23 is rotated forward from the position of about 247.5° illustrated in FIG. 5 (S202). During the rotation of the cam 23 within about 270° to about 360°, the lead roller 10 is gradually separated from the first lead roller 9. When the cam 23 reaches the position of about 360° (i.e., 0°), the lead roller 10 is completely separated from the first lead roller 9. Incidentally, the CPU circuit unit 1000 starts to rotate the releasing motor M4 forward in such a manner that the rear end of the document passes the lead roller 10 and the first lead roller 9 after the complete separation of the lead roller 10 from the first lead roller 9.

Additionally, when the cam 23 reaches the position of about 45°, the cam position detecting sensor S7 is turned off by the light shielding plate 25 (that is, in a light shielding state) (S203), so that the CPU circuit unit 1000 controls the releasing motor M4 so as to rotate the cam 23 by a residual angle of about 22.5° (S205). In this manner, the cam 23 is stopped at a position of about 67.5° (S206) In this state, the lead roller 10 is kept in a state separated from the first lead roller 9.

Incidentally, in S202 and S203, when the cam position detecting sensor S7 cannot be turned off even if a predetermined period of time is elapsed after the CPU circuit unit 1000 starts to control the releasing motor M4 (S204), the CPU circuit unit 1000 stops the releasing motor M4 (S207). And then, the CPU circuit unit 1000 displays an error on the display unit (see FIG. 3) (S208), thereby leading to abnormal end (S212).

When the operation for separating the lead roller 10 from the first lead roller 9 is normally performed by the cam 23, the CPU circuit unit 1000 stops the releasing motor M4 (S206). Thereafter, the CPU circuit unit 1000 determines as to whether or not the document conveyed immediately before is a final document (S209). When the sensors S1, S2 and S3 do not detect a next document or a sensor, not shown, detects that no document is stacked on the stack tray 2, the CPU circuit unit 1000 determines that the document conveyed immediately before is a final document. When it is determined that the document conveyed immediately before is not a final document, the CPU circuit unit 1000 subjects the next document to the pressing operation and the separating operation again. In the meantime, in the case where it is determined that the document conveyed immediately before is a final document, the CPU circuit unit 1000 waits for the completion of the discharge of the final document (S210), followed by an initial operation of the cam (S300), described later, thereby leading to the end.

[Description of Initial Operation]

Figure 9:
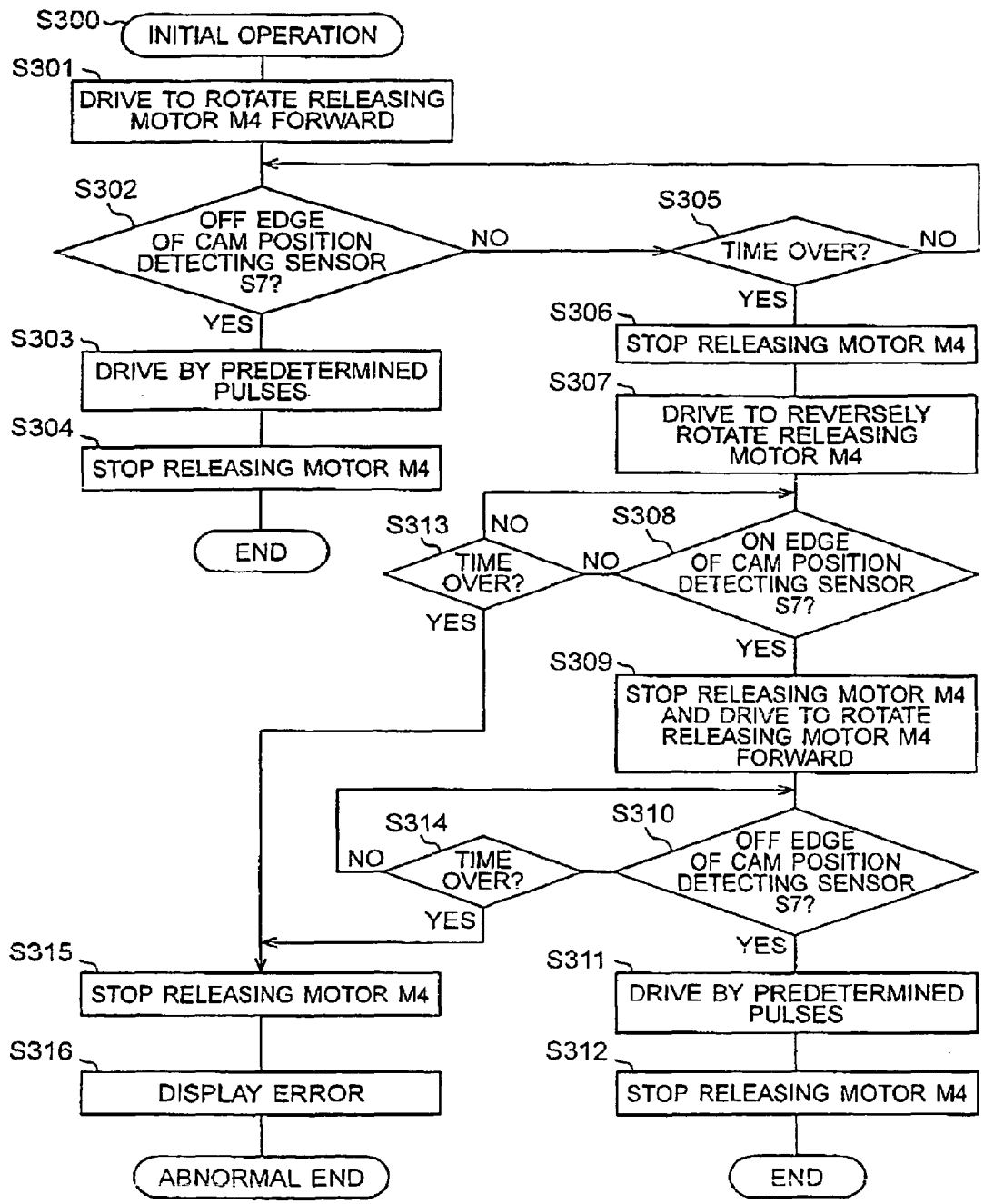
FIG. 9 is a flowchart illustrating an initial operation.

A description will be given of an initial operation in reference to FIGS. 2 to 6 and 9. FIG. 9 is a flowchart illustrating the sequence of the initial operation.

The initial operation signifies that the cam 23 is made to wait at the position of about 67.5° as one example of the predetermined rotation positions illustrated in FIG. 5. The document conveying apparatus 1 in the present embodiment is provided with only one cam position detecting sensor S7. Therefore, in the case where the position of the cam 23 is varied, for example, when the power source is turned on or after the document jamming is cleared, the document conveying apparatus 1 is configured such that it cannot detect as to whether the lead roller 10 is pressed against the first lead roller 9 or the lead roller 10 is separated from the first lead roller 9. Thus, the document conveying apparatus 1 in the present embodiment is configured such that the initial operation is surely performed when a job is finished, the power source is turned on, or a cover of the document conveying apparatus 1 is closed after the document jamming is cleared.

When a job is finished, the power source is turned on, or a cover of the document conveying apparatus 1 is closed after the document jamming is cleared, the CPU circuit unit 1000 rotates the releasing motor M4 forward (S301). Subsequently, the CPU circuit unit 1000 determines as to whether or not the cam position detecting sensor S7 can detect an OFF edge 25a of the light shielding plate 25 for turning off the cam position detecting sensor S7 within a predetermined period of time (S302). Here, a definition may be made based on predetermined pulses in place of the determination based on the predetermined period of time.

In the case where the OFF edge 25*a* of the light shielding plate 25 is detected within the predetermined period of time (or the predetermined pulses), the CPU circuit unit 1000 rotates the releasing motor M4, and rotates the light shielding plate 25 by about 22.5° (S303). And then, the CPU circuit unit 1000 stops the releasing motor M4 in such a manner that the light shielding plate 25 is located at the position of about 67.5° (S304), thereby leading to normal end.

In contrast, in the case where the cam position detecting sensor S7 cannot detect the OFF edge 25*a* of the light shielding plate 25 even if the predetermined period of time (or the predetermined pulses) is elapsed (S305), the CPU circuit unit 1000 determines that a power swing of the releasing motor M4 occurs by self-drive acceleration when the cam 23 is located at the position of about 160° to about 180° illustrated in FIG. 6, thereby stopping the releasing motor M4 (S306).

Thereafter, the CPU circuit unit 1000 reversely rotates the releasing motor M4 in a direction of a low load (S307). The CPU circuit unit 1000 reversely rotates the releasing motor M4 (S307). And then, the CPU circuit unit 1000 determines as to whether or not the cam position detecting sensor S7 can detect an ON edge 25*b* of the light shielding plate 25 for turning on the cam position detecting sensor S7 within a predetermined period of time (or predetermined pulses) (S308). When the cam position detecting sensor S7 can detect the ON edge 25*b* of the light shielding plate 25 within the predetermined period of time (or the predetermined pulses), the CPU circuit unit 1000 stops the releasing motor M4. In contrast, if the cam position detecting sensor S7 cannot detect the ON edge 25*b* of the light shielding plate 25 within the predetermined period of time (or the predetermined pulses) (S313), the CPU circuit unit 1000 determines that the releasing motor M4 cannot be driven at a load other than that of the cam 23. Thus, the CPU circuit unit 1000 stops the rotation of the releasing motor M4 (S315), and further, displays an error on the display unit 27 via the main CPU circuit unit 1007 (S316), thereby leading to abnormal end.

In S307, the CPU circuit unit 1000 reversely rotates the releasing motor M4. And then, the CPU circuit unit 1000 normally stops the releasing motor M4 when the cam position detecting sensor S7 detects the ON edge 25*b* of the light shielding plate 25 within the predetermined period of time (or the predetermined pulses) (S308). Thereafter, the CPU circuit unit 1000 rotates the releasing motor M4 forward again (S309). And then, the CPU circuit unit 1000 determines again as to whether or not the cam position detecting sensor S7 can detect the OFF edge 25*a* of the light shielding plate 25 within the predetermined period of time (or the predetermined pulses) (S310) In the case where the cam position detecting sensor S7 can detect the OFF edge 25*a* of the light shielding plate 25 within the predetermined period of time (or the predetermined pulses), the CPU circuit unit 1000 rotates the cam 23 by about 22.5° (S311). And then, the CPU circuit unit 1000 stops the releasing motor M4 in such a manner that the cam 23 is located at the position of about 67.5°, thereby leading to normal end of the initial operation (S312).

In contrast, unless the OFF edge 25*a* of the light shielding plate 25 can be detected within the predetermined period of time (or the predetermined pulses) (S313), the CPU circuit unit 1000 stops the rotation of the releasing motor M4 (5315), and then, displays an error (5316), thereby leading to abnormal end.

The description has been given of the configuration in which the releasing motor M4 in the present embodiment is exemplified by the pulse motor, and the pressure, separation and initial operations are performed between the lead roller 10 and the first lead roller 9 based on the predetermined period of time or the predetermined pulses. However, even if a DC motor is used as the releasing motor, a similar operation may be performed by control based on a predetermined period of time.

The description has been given of the configuration in which the cam position detecting sensor in the present embodiment detects the position of the cam 23 based on whether or not the light is shielded by the light shielding plate 25. Incidentally, the light shielding plate may be formed into a circular shape and a reflecting plate may be provided, so that a sensor may be used for detecting the position of the cam 23 by detecting light reflected on the reflecting plate.

The reader unit 60 in the present embodiment is provided with the document conveying apparatus 1 capable of performing the initial operation without requiring any excessive electric power or any complicated control. Thus, it is possible to reduce a cost by simplifying the structure.

Furthermore, since the motor is driven to be rotated reversely once, and then, is driven to be rotated forward in the document conveying apparatus 1 in the present embodiment in the case where, for example, the cam member having a load of a large fluctuation is stopped at a portion of a highest load or the detecting means cannot respond despite of the drive in the predetermined period of time or the predetermined pulses, the initial operation can be securely performed without any error.

What is claimed is:

1. A sheet conveying apparatus comprising:
    a pair of conveyance rotating members for conveying a sheet while holding the sheet and rotating;
    a rotatable cam member;
    a forward and reversely rotatable motor for rotating the cam member;
    an operating member which contacts against the cam member so as to operate in such a manner as to press one of the pair of conveyance rotating members against the other conveyance rotating member or separate one from the other according to the rotation of the cam member;
    a detecting unit for detecting a rotation of the cam member; and
    control means for controlling the motor based on the detection result output from the detecting unit;
    wherein the control means controls to reversely rotate the motor in the case where the detecting unit does not detect the rotation of the cam member even if the motor is driven to be rotated forward so as to rotate the cam member.

2. A sheet conveying apparatus according to claim 1, wherein the control means controls to reversely rotate the motor in the case where the detecting unit does not detect the rotation of the cam member even if the motor is driven to be rotated forward so as to rotate the cam member in a stop state.

3. A sheet conveying apparatus according to claim 2, wherein the control means performs an initial operation for locating the cam member at a predetermined rotational position; and
    the control means controls to reversely rotate the motor, and thereafter, to rotate the motor forward so as to locate the cam member at the predetermined rotational position in the case where the detecting unit does not detect the rotation of the cam member even if the motor is driven to be rotated forward so as to rotate the cam member in a stop state when the initial operation is performed.

4. A sheet conveying apparatus according to claim 2, wherein the control means controls to reversely rotate the motor in the case where the detecting unit does not detect the rotation of the cam member even if a predetermined period of time is elapsed after the motor is driven to be rotated forward so as to rotate the cam member in a stop state.

5. A sheet conveying apparatus according to claim 2, wherein the motor is a pulse motor; and the control means controls to reversely rotate the motor in the case where the detecting unit does not detect the rotation of the cam member even if the pulse motor is driven to be rotated forward by predetermined pulses so as to rotate the cam member in a stop state.

6. A sheet conveying apparatus according to claim 1, wherein the motor is a DC motor or a pulse motor.

7. A sheet conveying apparatus according to claim 1, further comprising:

informing means for informing a user of an abnormal state;

wherein the informing means informs the user of the abnormal state in the case where the detecting unit does not detect the rotation of the cam member even if the motor is driven to be rotated forward so as to rotate the cam member, and thereafter, the detecting unit does not detect the rotation of the cam member even if the control means drives to reversely rotate the motor.

8. A sheet conveying apparatus according to claim 1, wherein the detecting unit includes a sensor for detecting the rotational position of the cam member, and a plate member rotated integrally with the cam member so as to turn on or off the sensor; and the control means controls to reversely rotate the motor in the case where ON or OFF of the sensor is not changed over even if the motor is driven to be rotated forward so as to rotate the cam member in a stop state.

9. A sheet conveying apparatus according to claim 1, wherein the cam member includes two circular arcuate portions different in radius of curvature and two straight portions connecting both ends of the two circular arcuate portions, respectively; and the operating member is a tilting lever which tilts according to the rotation of the cam member.

10. An image reading apparatus comprising:

a reading sensor for reading an image on a sheet;

a pair of conveyance rotating members for conveying the sheet to the reading sensor while holding the sheet and rotating;

a rotatable cam member;

a forward and reversely rotatable motor for rotating the cam member;

an operating member which contacts against the can member so as to operate in such a manner as to press one of the pair of conveyance rotating members against the other conveyance rotating member or separate one from the other according to the rotation of the cam member;

a detecting unit for detecting a rotation of the cam member; and control means for controlling the motor based on the detection result output from the detecting unit;

wherein the control means controls to reversely rotate the motor in the case where the detecting unit does not detect the rotation of the cam member even if the motor is driven to be rotated forward so as to rotate the cam member.

11. An image reading apparatus according to claim 10, wherein the control means controls to reversely rotate the motor in the case where the detecting unit does not detect the rotation of the cam member even if the motor is driven to be rotated forward so as to rotate the cam member in a stop state.

12. An image reading apparatus according to claim 10, further comprising:

sheet conveying means disposed downstream of the reading sensor;

wherein the reading sensor can read an image on a sheet being conveyed by both of the pair of conveyance rotating members and the sheet conveying means; and the control means controls the rotation of the motor in such a manner that the pair of conveyance rotating members separate from each other by the operating member before the rear end of the sheet passes the pair of rotating members.

13. A cam member driving device comprising:

a cam member;

a member which is moved according to the rotation of the cam member in contact against the cam member;

a forward and reversely rotatable motor for rotating the cam member;

a detecting unit for detecting a rotation of the cam member; and control means for controlling the motor based on the detection result output from the detecting unit;

wherein the control means controls the motor to reversely rotate the cam member in the case where the detecting unit does not detect the rotation of the cam member even if the motor is driven to be rotated forward so as to rotate the cam member.

14. A cam member driving device according to claim 13, wherein the control means controls to reversely rotate the motor in the case where the detecting unit does not detect the rotation of the cam member even if the motor is driven to be rotated forward so as to rotate the cam member in a stop state.

* * * * *

UNITED STATES PATENT AND TRADEMARK OFFICE
CERTIFICATE OF CORRECTION

PATENT NO. : 7,420,718 B2
APPLICATION NO. : 10/834015
DATED : September 2, 2008
INVENTOR(S) : Koji Shimizu It is certified that error appears in the above-identified patent and that said Letters Patent is hereby corrected as shown below:

COLUMN 1:
        Line 11, "other-roller," should read -- other roller, --.
        Line 40, "has" should read -- have --.
        Line 52, "need" should read -- needs to --.
        Line 57, "reading" should read -- reading of --.
        Line 66, "need" should read -- needs to --.

COLUMN 6:
        Line 8, "both-sided" should read -- double-sided --.
        Line 24, "one-side" should read -- one-sided --.
        Line 26, "both-side" should read -- double-sided --.
        Line 32, "one-side" should read -- one-sided --.
        Line 45, "reaches," should read -- reaches the first registration rollers, --.
        Line 50, "corrected straight." should read -- straightened. --.

COLUMN 7:
        Line 36, "double-side" should read -- double-sided --.
        Line 63, "corrected straight." should read -- straightened. --.

COLUMN 8:
        Line 10, "read In" should read -- read. In --.
        Line 17, "need" should read -- needs to --.

COLUMN 9:
        Line 19, "both-side" should read -- double-sided --.
        Line 63, "triangle." should read -- triangular form. --.

COLUMN 10:
        Line 29, "started to separate" should read -- made to start separating --.
        Line 34, "45° Consequently," should read -- 45°. Consequently, --.
        Line 46, "in" should read -- of --.
        Line 50, "varied straight," should read -- not maintained to be straight, --.
        Line 58, "the-document" should read -- the document --.
        Line 59, "one-side" should read -- one-sided --.

UNITED STATES PATENT AND TRADEMARK OFFICE
CERTIFICATE OF CORRECTION

PATENT NO. : 7,420,718 B2
APPLICATION NO. : 10/834015
DATED : September 2, 2008
INVENTOR(S) : Koji Shimizu It is certified that error appears in the above-identified patent and that said Letters Patent is hereby corrected as shown below:

COLUMN 11:
      Line 1, "both-side" should read -- double-sided --.
      Line 5, "one-side" should read -- one-sided --.
      Line 8, "on" should read -- of --.
      Line 26, "(S102) During" should read -- (S102). During --.

COLUMN 12:
      Line 10, "(S206) In" should read -- (S206). In --.
      Line 27, "document" should read -- document, --.

COLUMN 13:
      Line 53, "(S310) In" should read -- (S310). In --.

COLUMN 14:
      Line 28, "of" should be deleted.

COLUMN 16:
      Line 1, "can" should read -- cam --.

Signed and Sealed this

Twentieth Day of January, 2009

JON W. DUDAS
*Director of the United States Patent and Trademark Office*